United States Patent
Curtis et al.

(10) Patent No.: US 9,422,404 B2
(45) Date of Patent: Aug. 23, 2016

(54) 2-AMINOIMIDAZOLE-FUNCTIONAL SILICONE COMPOSITIONS AND METHODS OF MAKING THE SAME

(71) Applicant: Dow Corning Corporation, Midland, MI (US)

(72) Inventors: James Curtis, Midland, MI (US); William J. Schulz, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 14/773,762

(22) PCT Filed: Mar. 13, 2014

(86) PCT No.: PCT/US2014/025964
§ 371 (c)(1),
(2) Date: Sep. 9, 2015

(87) PCT Pub. No.: WO2014/151545
PCT Pub. Date: Sep. 25, 2014

(65) Prior Publication Data
US 2016/0024257 A1    Jan. 28, 2016

Related U.S. Application Data

(60) Provisional application No. 61/787,296, filed on Mar. 15, 2013.

(51) Int. Cl.
| | | |
|---|---|---|
| C08L 83/04 | (2006.01) | |
| C08G 77/20 | (2006.01) | |
| C08G 77/26 | (2006.01) | |
| C09D 5/16 | (2006.01) | |
| C09D 183/04 | (2006.01) | |
| C08G 77/388 | (2006.01) | |

(52) U.S. Cl.
CPC ............ *C08G 77/26* (2013.01); *C08G 77/388* (2013.01); *C08L 83/04* (2013.01); *C09D 5/1675* (2013.01); *C09D 183/04* (2013.01); *C08G 77/20* (2013.01)

(58) Field of Classification Search
CPC .... C09D 5/1675; C09D 183/04; C08L 83/04
USPC .......................................... 524/868; 526/27
See application file for complete search history.

(56) References Cited

U.S. PATENT DOCUMENTS

| | | | | |
|---|---|---|---|---|
| 5,580,943 | A | * | 12/1996 | Nakashima ........... C07F 7/0854 528/26 |
| 7,906,544 | B2 | | 3/2011 | Melander et al. |
| 8,278,340 | B2 | | 10/2012 | Melander et al. |
| 8,653,124 | B2 | | 2/2014 | Melander et al. |
| 2009/0028807 | A1 | | 1/2009 | Giustiniani et al. |
| 2010/0272660 | A1 | | 10/2010 | Malle et al. |

FOREIGN PATENT DOCUMENTS

WO    2012041934 A1    4/2012

OTHER PUBLICATIONS

Peng, et. al., "Inihibition of Acinetobacter baumannii Biofilm Formation on a Methacrylate Polymer Containing a 2-Aminoimidazole Subunit", The Royal Society of Chemistry, 2011, pp. 1-43, (2011).

* cited by examiner

*Primary Examiner* — Kelechi Egwim
(74) *Attorney, Agent, or Firm* — Timothy J. Troy

(57) ABSTRACT

A method of making a 2-aminoimidazole-functional silicone elastomer includes forming a mixture by combining a silicone elastomer base material having vinyl functionality, a 2-aminoimidazole-functional monomer or a 2-aminoimidazole-functional oligomer, and a free-radical initiator. Optionally, one or more cross-linkers, pigments, vinyl polymer, non-functional silicone fluid, or any combination thereof may also be included in the mixture.

20 Claims, No Drawings

2-AMINOIMIDAZOLE-FUNCTIONAL SILICONE COMPOSITIONS AND METHODS OF MAKING THE SAME

CROSS REFERENCE TO RELATED APPLICATIONS

This application is a U.S. national stage filing under 35 U.S.C. §371 of PCT Application No. PCT/US14/025,964 filed on 13 Mar. 2013, which claims the benefit of U.S. Provisional Patent Application No. 61/787,296 filed 15 Mar. 2013 under 35 U.S.C. §119 (e). PCT Application No. PCT/US14/025964 and U.S. Provisional Patent Application No. 61/787,296 are hereby incorporated by reference.

BACKGROUND OF THE INVENTION

Surfaces of many different types of products in many different industries and fields of use are often plagued by the negative effects of surface-attached communities of microorganisms called biofilms. For example, such biofilms often play a large role in causing and worsening infections of indwelling medical devices such as catheters, prosthetic cardiac valves, intrauterine devices, and the like.

Biofilms may also negatively affect various other industries including, e.g., transportation, petroleum, mining, paper milling, agriculture, food preparation and storage, power plants, and the like. For example, biofilms in marine engineering systems (e.g., pipelines of the offshore oil and gas industry) may cause substantial corrosion problems. Biofilms formed on boat hulls can lead to biofouling of seagoing vessels, which may reduce maximum vessel speed by up to 20%, thereby prolonging voyages and consuming additional amounts of fuel. Corrosion and mechanical removal of biofilms from ships' hulls may also reduce the useful life of ships.

Thus, there exists a need to reduce or eliminate biofilms of various surfaces in various industries.

BRIEF SUMMARY OF THE INVENTION

According to one process of the present invention, a method of making a 2-aminoimidazole-functional silicone elastomer includes forming a mixture by combining (A) a silicone elastomer base material having vinyl functionality, (B) a 2-aminoimidazole-functional monomer or a 2-aminoimidazole-functional oligomer, and (C) a free-radical initiator. Optionally, one or more cross-linkers, pigments, vinyl polymers, non-functional silicone fluids, or any combination thereof may also be included in the mixture.

According to one embodiment of the present invention, a 2-aminoimidazole-functional silicone elastomer composition includes (A) a silicone elastomer base material having vinyl functionality, (B) a 2-aminoimidazole-functional monomer or a 2-aminoimidazole-functional oligomer, and, (C) optionally, one or more cross-linkers, pigments, vinyl polymers, non-functional silicone fluids, or any combination thereof.

DETAILED DESCRIPTION OF THE INVENTION

All amounts, ratios, and percentages are by weight unless otherwise indicated. The articles 'a', 'an', and 'the' each refer to one or more, unless otherwise indicated by the context of specification. The disclosure of ranges includes the range itself and also anything subsumed therein, as well as endpoints. Similarly, the disclosure of Markush groups includes the entire group and also any individual members and subgroups subsumed therein. For example, the Markush group including a hydrogen atom, an alkyl group, an aryl group, or an aralkyl group includes the member alkyl individually; the subgroup alkyl and aryl; and any other individual member and subgroup subsumed therein.

2-aminoimidazole-functional silicone elastomer compositions according to the concepts discussed herein generally include: (A) a silicone elastomer base material having vinyl functionality; (B) a 2-aminoimidazole-functional monomer or a 2-aminoimidazole-functional oligomer; and (C) optionally, one or more cross-linkers, pigments, vinyl polymer, non-functional silicone fluid, or any combination thereof, wherein the composition is prepared using a free-radical initiator. The 2-aminoimidazole-functional silicone elastomer discussed herein may be formed by combining: (A) a silicone elastomer base material having vinyl functionality; (B) a 2-aminoimidazole-functional monomer or a 2-aminoimidazole-functional oligomer; (C) a free-radical initiator; and (D) optionally, one or more cross-linkers, pigments, vinyl polymer, non-functional silicone fluid, or any combination thereof.

2-aminoimidazole functional siloxanes may be generated using several methods. The resulting materials may be polymers, or they may be oligomers that may undergo a further reaction(s) to polymers. The polymers and oligomers may contain additional component(s) such as, but not limited to, silica, pigments, pharmaceutical excipients, actives, additives, combinations thereof, or the like. The additional component(s) may be component(s) in a one or multi-component system, which, when combined and reacted, will result in a 2-aminoimidazole-functional silicone polymer. The 2-aminoimidazole-functional silicone polymer may be considered a co-polymer, as the 2-aminoimidazole-functional reactant can react with, e.g., another 2-aminoimidazole-containing group or with a siloxane.

(A) Silicone Elastomer Base Material Having Vinyl Functionality

In the inventive compositions/methods described herein, silicone elastomer base materials are used to form a 2-aminoimidazole-functional silicone polymer. The silicone elastomer base materials contemplated for use in the inventive concepts described herein include, but are not limited to, dimethyl siloxane, dimethylvinylsiloxy-terminated, amorphous silica, hexamethyldisilazane, water, and dimethyl siloxane, hydroxy-terminated, combinations thereof, or the like.

Non-limiting examples of suitable silicone elastomer base materials that are commercially available include, but are not limited to, DOW CORNING® C6-235, C6-250, C6-265 Elastomers, DOW CORNING® QP1 (e.g., QP1-30, QP1-50, QP1-60, QP1-70) Silicone Elastomers, DOW CORNING® QP1-30 Silicone Elastomer (CHN), DOW CORNING® QP1-30 HC Balloon Rubber Base, DOW CORNING® QP1 (e.g., QP1-25, QP1-40, QP1-55, QP1-70) Base JPN, as well as SILASTIC® Q7-4535, Q7-4550, and Q7-4565 Biomedical Grade ETR Elastomers available from Dow Corning Corporation, Midland, Mich. Any amount of 2-aminoimidazole functionality that provides microbial or infection control benefits may be included.

(B) 2-Aminoimidazole-Functional Monomer/Oligomer

In the inventive compositions/methods described herein, 2-aminoimidazole-functional monomers or oligomers are also used to form a 2-aminoimidazole-functional silicone polymer. The 2-aminoimidazole-functional monomers/oligomers contemplated for use in the inventive concepts described herein include, but are not limited to, those described in U.S. Pat. Nos. 7,906,544 and 8,278,340 (which are hereby incorporated by reference), and the like. U.S. Pat. No. 8,278,340 applies some of the imidazole compounds of U.S. Pat. No. 7,906,544 in the field of agriculture to assist in controlling biofilms on plants.

For example, the 2-aminoimidazole compound may include

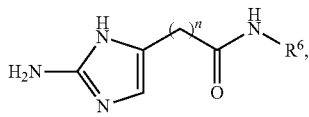

wherein n is 2, 3, or 4, saturated or unsaturated; and $R^6$ is H, alkyl, alkenyl, or alkynyl; or a pharmaceutically acceptable salt or prodrug thereof. In this compound, $R^6$ generally includes functionality through which a copolymer could be created.

The 2-aminoimidazole compound may also or alternatively include any of the following or any combination thereof:

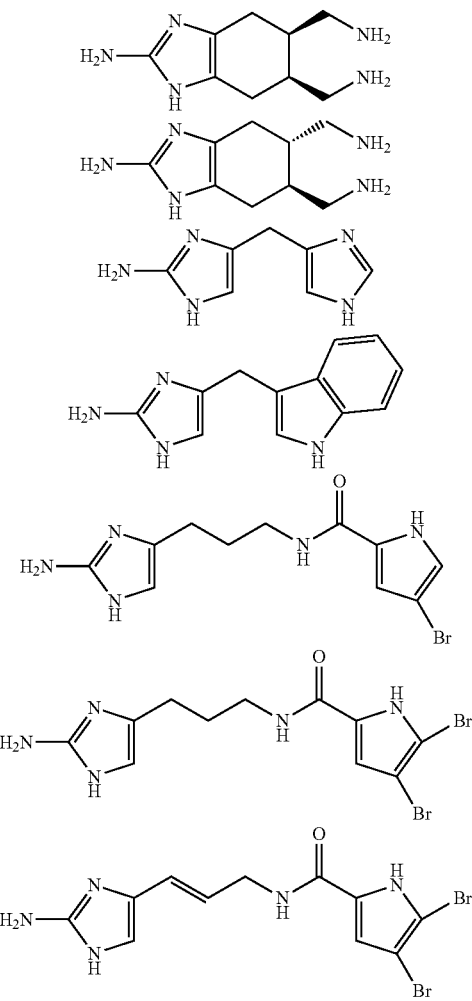

-continued

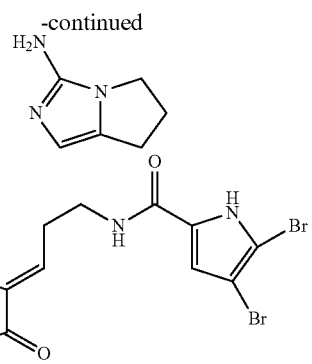

(C) Free-Radical Initiators

In the inventive compositions/methods described herein, free-radical initiators are also used to form a 2-aminoimidazole-functional silicone polymer. The free-radical initiators contemplated for use in the inventive concepts described herein include, but are not limited to, vinyl-specific or alkynyl-specific peroxides, 2,5-dimethyl-2,5-di(t-butylperoxy)hexane, dicumyl peroxide, 1,3-di(tertbutylperoxyisopropyl)-benzene, 1,4-di(tertbutylperoxyisopropyl)-benzene, 2,5-demethyl-2,5-di-tertbutylperoxy-3-hexyne, combinations thereof, or the like.

(D) Optional Components

The compositions described herein may also include other, optional components. Such optional components may include, but are not limited to, one or more cross-linkers and/or pigments. The compositions may also optionally include a second vinyl polymer. For example, it may be desirable for a rubber product to include a large and a small molecular weight polymer to improve the properties of the product after curing. In another example, polymers with one or more pendant ethers are included instead of or in addition to terminal vinyl groups, which may improve the tear strength. A non-functional silicone fluid may also optionally be added, e.g., to induce "self bleed" character to enable easier insertion of the tubing on which it is applied into another component or to enable easier insertion of another component into the tubing.

The materials may be combined via a relatively simple admixture, although they may also be combined in solvent. The cure temperature may be controlled because the peroxide initiator is taken to activation temperature, while the 2-aminoimidazole compound (i.e., monomer or oligomer) may be negatively impacted by heat. In one embodiment, the copolymer is processed via molding, extrusion, dip coating, or another process or combination of processes.

The 2-aminoimidazole-functional silicone composition described herein may be curable to form an elastomer, gel, or fluid. Such cured compositions can be used, for example, to coat, lubricate, and/or fabricate products or components of products useful in many fields. One such application is in the medical device field, where the compositions described herein may be used to coat, lubricate, and/or fabricate products such as (but not limited to) catheters, surgical drains, shunts, implants, inserts, wound dressings, surgical drapes, patient securement devices, needles, syringes, examination or surgical gloves, surgical instruments, and the like. The 2-aminoimidazole-functional silicone compositions described herein may also be used in pharmaceutical or therapeutic biologic production.

Applications may also exist for 2-aminoimidazole-functional siloxanes in a variety of other industries and human endeavors that are negatively impacted by biofilm formation or where control of biofilms is desired. Some such non-limiting examples include the following industries: petroleum, mining, paper milling, agriculture, food preparation and storage, power plants, and the like.

Other potential uses for the 2-aminoimidazole-functional silicone compositions described herein are in the field of transportation, where the compositions of the present invention may be used to paint or otherwise coat a ship hull to assist the ship hull in resisting biofouling as it resides in, is submerged in, or sails bodies of water. The attachment of microbes and other forms of life, such as barnacles, would be reduced, resulting in substantial fuel savings and expedited voyage times.

EXAMPLES

The examples provided below are intended to illustrate some embodiments of the invention described herein and should not be interpreted as limiting the scope of the invention as set forth in the claims. Reference examples should not be deemed to be prior art unless so indicated.

Example 1

According to one non-limiting example, a 2-aminoimidazole-functional silicone elastomer was prepared as follows. A silicone elastomer base material having vinyl functionality was combined with a 2-aminoimidazole-functional monomer, for example, one of the following structures (or any combination thereof):

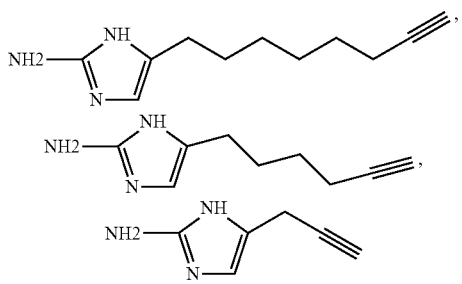

In one embodiment, the amount of silicone elastomer base material was from about 80 wt % to about 99.5 wt %. The silicone elastomer base material having vinyl functionality was combined with a 2-aminoimidazole-functional monomer or oligomer by use of a free-radical initiator such as a vinyl-specific or an alkynyl-specific peroxide, which are types of peroxide reaction initiators that favor crosslinking on double or triple bonds such as vinyl, allyl, or ethynyl. One non-limiting example of a suitable peroxide initiator is 2,5-dimethyl-2,5-di(t-butylperoxy)hexane (such as VAROX® DBPH from R.T. Vanderbilt Company, Inc., Norwalk, Conn., USA). This peroxide initiator may be particularly desirable in healthcare applications. In one embodiment, the composition includes about 0.1 wt % to about 20 wt % 2,5-dimethyl-2,5-di(t-butylperoxy)hexane.

The silicone elastomer base may be pre-made by various formulas, including, but not limited to, about 75.9 wt % dimethyl siloxane, dimethylvinylsiloxy-terminated, about 18.8 wt % amorphous silica, about 3.4 wt % hexamethyldisilazane, about 1.1 wt % water, and about 0.7 wt % dimethyl siloxane, hydroxy-terminated. Various processes may be used to make a silicone elastomer base. One non-limiting process includes loading about 75 wt % dimethylvinylsiloxy-terminated dimethyl siloxane into a sigma-blade mixer, such as those from Baker-Perkins Ltd. (Peterborough, New England). Water may then be added. The resulting mixture may then be covered with nitrogen and mixed. Hexamethyldisilazane may then be added, and silica may be loaded. According to one embodiment, the silica is added in stages such that the mixture is mixed in between additions of silica. The mixture may continue to be mixed and may be heated to about 190° C. for about one hour under nitrogen. The temperature may then be decreased to about 80° C. and the remainder of the dimethylvinylsiloxy-terminated dimethyl siloxane may be added slowly while continuing mixing. The hydroxy-terminated dimethyl siloxane may then be added, and the mixture may continue to be cooled and mixed.

According to one process, a 2-aminoimidazole-functional silicone elastomer may be formed by combining (a) about 94.6 wt % silicone elastomer base with (b) about 1.6 wt % 2,5-dimethyl-2,5-di(t-butylperoxy)hexane and (c) about 3.9 wt % 4-(dec-9-ynyl)-1H-imidazole-2-amine hydrochloride. In one embodiment, about 0.1 wt % to about 20 wt % 2,5-dimethyl-2,5-di(t-butylperoxy)hexane is used. The resulting mixture may then be mixed and heated to a temperature of from about 90° C. to about 200° C. for about 0.5 minutes to about 210 minutes. In one embodiment, the mixture is heated to 150° C. for about 15 minutes in a mold corresponding to the desired shape.

In addition to the technique described herein in Example 1, it is contemplated that 0-100% of dimethylvinylsiloxy-terminated dimethyl siloxane may be used.

Example 2

According to another process, a 2-aminoimidazole-functional silicone elastomer may be formed by combining (a) about 98 wt % silicone elastomer base with about 1.6% 2,5-dimethyl-2,5-di(t-butylperoxy)hexane and (b) about 0.4 wt % of the monomer with empirical formula $C_{26}H_{47}ClN_4O$ and structure

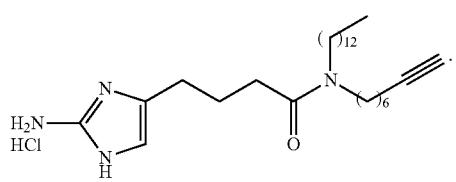

The resulting mixture may be mixed and heated to about 160° C. for about 5 minutes in a mold corresponding to the desired shape.

While the invention is susceptible to various modifications and alternative forms, specific embodiments have been shown by way of example in the examples and described in detail herein. It should be understood, however, that the invention is not intended to be limited to the particular forms disclosed. Rather, the invention is to cover all modifications, equivalents, and alternatives falling within the spirit and scope of the invention as defined by the appended claims.

The invention claimed is:

1. A method of making a 2-aminoimidazole-functional silicone elastomer comprising forming a mixture by combining:
   (A) a silicone elastomer base material having vinyl functionality;
   (B) a 2-aminoimidazole-functional monomer or a 2-aminoimidazole-functional oligomer;
   (C) a free-radical initiator; and
   (D) optionally, one or more cross-linkers, pigments, vinyl polymer, non-functional silicone fluid, or any combination thereof.

2. The method of claim 1, wherein the 2-aminoimidazole-functional monomer is

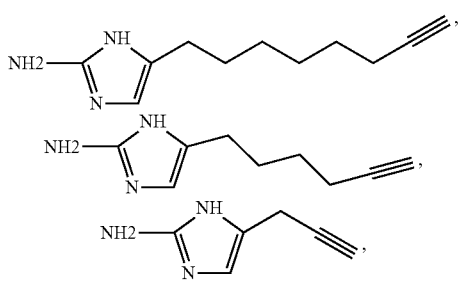

or any combination thereof.

3. The method of claim 1, wherein the free-radical initiator is 2,5-dimethyl-2,5-di(t-butylperoxy)hexane, dicumyl peroxide, 1,3-di(tertbutylperoxyisopropyl)-benzene, 1,4-di(tertbutylperoxyisopropyl)-benzene, 2,5-demethyl-2,5-di-tertbutylperoxy-3-hexyne, or combinations thereof.

4. The method of claim 3, wherein the free-radical initiator is 2,5-dimethyl-2,5-di(t-butylperoxy)hexane.

5. The method of claim 1, wherein the 2-aminoimidazole-functional monomer is 4-(dec-9-ynyl)-1H-imidazole-2-amine hydrochloride.

6. The method of claim 4, wherein the mixture includes from 0.1 wt % to 20 wt % 2,5-dimethyl-2,5-di(t-butylperoxy)hexane.

7. The method of claim 1, wherein the silicone elastomer base comprises dimethyl siloxane, dimethylvinylsiloxy-terminated, amorphous silica, hexamethyldisilazane, water, and dimethyl siloxane, hydroxy-terminated.

8. The method of claim 1, wherein the mixture is heated at a temperature of from 90° C. to 200° C. for about 0.5 minutes to 210 minutes.

9. The method of claim 1, wherein the mixture comprises about 80 wt % to about 99.5 wt % silicone elastomer base material.

10. A 2-aminoimidazole-functional silicone elastomer composition comprising:
   (A) a silicone elastomer base material having vinyl functionality;
   (B) a 2-aminoimidazole-functional monomer or a 2-aminoimidazole-functional oligomer; and
   (C) optionally, one or more cross-linkers, pigments, vinyl polymer, non-functional silicone fluid, or any combination thereof.

11. The composition of claim 10, wherein the composition further comprises a free-radical initiator.

12. The composition of claim 10, wherein the 2-aminoimidazole-functional monomer is

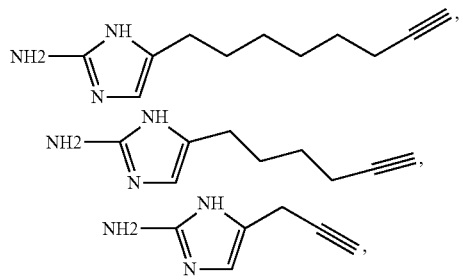

or any combination thereof.

13. The composition of claim 11, wherein the free-radical initiator is 2,5-dimethyl-2,5-di(t-butylperoxy)hexane, dicumyl peroxide, 1,3-di(tertbutylperoxyisopropyl)-benzene, 1,4-di(tertbutylperoxyisopropyl)-benzene, 2,5-demethyl-2,5-di-tertbutylperoxy-3-hexyne, or combinations thereof.

14. The composition of claim 13, wherein the free-radical initiator is 2,5-dimethyl-2,5-di(t-butylperoxy)hexane.

15. The composition of claim 14, wherein the 2-aminoimidazole-functional monomer is 4-(dec-9-ynyl)-1H-imidazole-2-amine hydrochloride.

16. The method of claim 1, wherein (B) is

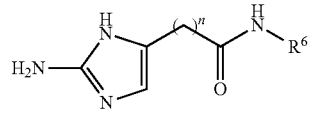

wherein n is 2, 3, or 4, saturated or unsaturated; and $R^6$ is H, alkyl, alkenyl, or alkynyl; or a pharmaceutically acceptable salt or prodrug thereof.

17. The composition of claim 10, wherein (B) is

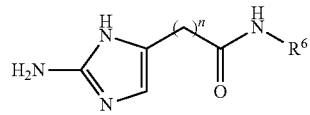

wherein n is 2, 3, or 4, saturated or unsaturated; and $R^6$ is H, alkyl, alkenyl, or alkynyl; or a pharmaceutically acceptable salt or prodrug thereof.

18. The composition of claim 10, wherein (A) comprises dimethyl siloxane, dimethylvinylsiloxy-terminated, amorphous silica, hexamethyldisilazane, water, and dimethyl siloxane, hydroxy-terminated.

19. The composition of claim 11, wherein (A) comprises dimethyl siloxane, dimethylvinylsiloxy-terminated, amorphous silica, hexamethyldisilazane, water, and dimethyl siloxane, hydroxy-terminated.

20. The composition of claim 17, wherein (A) comprises dimethyl siloxane, dimethylvinylsiloxy-terminated, amorphous silica, hexamethyldisilazane, water, and dimethyl siloxane, hydroxy-terminated.

* * * * *